United States Patent
Feng et al.

(10) Patent No.: US 11,012,351 B2
(45) Date of Patent: May 18, 2021

(54) SERVICE PATH COMPUTATION FOR SERVICE INSERTION

(71) Applicant: VMware, Inc., Palo Alto, CA (US)

(72) Inventors: Yong Feng, Palo Alto, CA (US); Yanjun Lin, Palo Alto, CA (US); Yang Ping, Palo Alto, CA (US); Pierluigi Rolando, Palo Alto, CA (US); Anuprem Chalvadi, Palo Alto, CA (US); Li Sun, Palo Alto, CA (US); Fenil Kavathia, Palo Alto, CA (US); Raju Koganty, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 100 days.

(21) Appl. No.: 16/282,802

(22) Filed: Feb. 22, 2019

(65) Prior Publication Data

US 2020/0274801 A1    Aug. 27, 2020

(51) Int. Cl.
| | |
|---|---|
| G06F 15/173 | (2006.01) |
| H04L 12/715 | (2013.01) |
| G06F 9/455 | (2018.01) |
| H04L 12/24 | (2006.01) |
| H04L 12/707 | (2013.01) |
| H04L 12/741 | (2013.01) |
| H04L 29/08 | (2006.01) |

(52) U.S. Cl.
CPC .......... H04L 45/64 (2013.01); G06F 9/45558 (2013.01); H04L 41/0803 (2013.01); H04L 45/22 (2013.01); H04L 45/745 (2013.01); H04L 67/16 (2013.01); *G06F 2009/45595* (2013.01)

(58) Field of Classification Search
CPC ..... H04L 45/64; H04L 41/0803; H04L 45/22; H04L 45/745; H04L 67/16; G06F 9/45558; G06F 2009/45595

USPC ....................................................... 709/238
See application file for complete search history.

(56) References Cited

U.S. PATENT DOCUMENTS

| | | | |
|---|---|---|---|
| 9,806,979 B1* | 10/2017 | Felstaine | H04L 41/0893 |
| 2016/0212237 A1* | 7/2016 | Nishijima | G06F 9/45558 |
| 2016/0261505 A1* | 9/2016 | Saniee | H04L 67/303 |
| 2017/0168864 A1* | 6/2017 | Ross | H04L 45/586 |
| 2017/0288971 A1* | 10/2017 | Jayaraman | H04L 41/5051 |

(Continued)

OTHER PUBLICATIONS

International Search Report and Written Opinion dated Jun. 9, 2020 for International Application No. PCT/US2020/019372 filed Feb. 21, 2020.

*Primary Examiner* — Atta Khan
(74) *Attorney, Agent, or Firm* — Patterson + Sheridan, LLP (57) ABSTRACT

The disclosure provides an approach for computing service paths for a service chain identifying a sequence of services. One method includes including information about a plurality of hosts in a heap. Each of the plurality of hosts includes at least one service virtual computing instance (SVCI) configured to provide at least one of the services of the service chain. The information includes, for each of the plurality of hosts, a number of service paths computed for the service chain at the host and one of a number of services provided by unused SVCIs of the host or a number of consecutive services provided by unused SVCIs of the host. The method further includes selecting a host from the heap based on the information. The method further includes generating a first service path for the service chain, the first service path identifying at least one SVCI of the selected host.

17 Claims, 6 Drawing Sheets

(56) References Cited

U.S. PATENT DOCUMENTS

2017/0318097 A1* 11/2017 Drew ................. H04L 41/0806
2018/0205637 A1*  7/2018 Li ....................... H04L 41/5058
2018/0262431 A1*  9/2018 Zhang ................. H04L 47/125

* cited by examiner

SERVICE PATH COMPUTATION FOR SERVICE INSERTION

BACKGROUND

Software defined networking (SDN) comprises a plurality of hosts in communication over a physical network infrastructure, each host having one or more virtualized endpoints such as virtual machines (VMs), containers, or other virtual computing instances (VCIs) that are connected to logical overlay networks that may span multiple hosts and are decoupled from the underlying physical network infrastructure. Though certain aspects are discussed herein with respect to VMs, it should be noted that they may similarly be applicable to other suitable VCIs.

SDN involves the use of a management plane (MP) and a control plane (CP). The management plane is concerned with receiving network configuration input from an administrator or orchestration automation and generating desired state data that specifies how the logical network should be implemented in the physical infrastructure. The management plane may have access to a database application for storing the network configuration input. The control plane is concerned with determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

The control plane is served by an application that can run in a single computing device or on a cluster of devices that communicate with each other and maintain the same state. Typically the centralized control plane (CCP) runs as a cluster to allow for load balancing, fault tolerance, and high availably. The CCP may be considered a central entity, in that even though it may be implemented in a distributed manner, each instance of a control process operates independently to control a portion of the network, as opposed to working in conjunction with different control processes running on different computing devices. Sharding is a mechanism used to provide high scalability and availability of a CCP by identifying "master" nodes among a plurality of nodes within the CCP for handling data from particular sources or of particular types.

VMs may exchange traffic with other endpoints (e.g., physical endpoints, other VMs, etc.) within the data center, referred to as east-west traffic. VMs may further exchange traffic with other endpoints outside the data center, referred to as north-south traffic. Sometimes, the data center is configured to provide network services for the exchange of east-west and/or north-south traffic. The insertion of network services to the path of traffic in the data center is referred to as service insertion. Network services can include one or more of access control list (ACL) filters, firewalls, load balancers, etc.

Service insertion works by configuring traffic to be forwarded to service providers that provide the network services, prior to forwarding the traffic to its actual destination. The mechanisms for forwarding the traffic are discussed in more detail with respect to FIG. 1. For example, the logical overlay network, also referred to as a software defined network (SDN), can include a number of VMs that provide network services, referred to herein as service VMs (SVMs), running on multiple hosts. The term "service VM" is equivalent to the terms "virtual network appliance" and "virtual network function" (VNF), which are also used in the field. In addition, the implementation of network services using virtual machines is often referred to as network function virtualization (NFV). Each SVM may provide a service. For example, an SVM A may provide service A, an SVM B may provide service B, etc. A single SVM may be configured to provide multiple services. Further, there may be multiple SVMs that provide the same service on the same or different hosts, such as to provide load balancing for providing a given service.

In certain cases, multiple network services are applied to traffic, prior to forwarding the traffic to its actual destination. In particular, the traffic is configured to be forwarded to a first SVM to apply a first service, then to a second SVM to apply a second service, and so on, sequentially, until all the requisite services are applied, and the traffic is then forwarded to its actual destination. The linkage of multiple networks services in order to apply to traffic is referred to as service chaining. For example, application of service A, then service B, then service C, in sequence, may be referred to as a service chain.

Since there are multiple SVMs providing services in the data center, as discussed, there may be multiple possible paths that traffic can take for application of a given service chain. In other words, since there may be multiple instances of each of service A, service B, and service C, any one network flow can satisfy the requirements of a service chain including A, B, and C services by having packets forwarded first to any one of the "A" services, then any one of the "B" services, and then any one of the "C" services. The actual path that the traffic flows through as network services are applied to the traffic, including the actual SVMs in sequence used to apply the networks services of a service chain, is referred to as a service path. Accordingly, there may be multiple possible service paths corresponding to a service chain.

Service path computation refers to the process of computing service paths for a service chain. Service path computation algorithms are designed to construct service paths by selecting SVMs for services indicated in the service chain. Due to the large number of SVMs in a data center, service path computation can be a complex process, that may utilize significant memory and processing resources of a computing device.

SUMMARY

Embodiments provide a method for computing service paths for a service chain, the service chain identifying a sequence of services. The method includes including information about a plurality of hosts in a heap. Each of the plurality of hosts includes at least one service virtual computing instance (SVCI) configured to provide at least one of the services of the service chain. The information includes, for each of the plurality of hosts, a number of service paths computed for the service chain at the host and one of a number of services provided by unused SVCIs of the host or a number of consecutive services provided by unused SVCIs of the host. The method further includes selecting a host from the heap based on the information. The method further includes generating a first service path for the service chain, the first service path identifying at least one SVCI of the selected host. The method further includes configuring one or more of the plurality of hosts to forward traffic along the first service path.

Further embodiments provide a computer system comprising one or more processors configured to perform the method as set forth above.

Further embodiments include a non-transitory computer-readable storage medium storing instructions that, when executed by a computer system, cause the computer system to perform the method as set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides approaches to service path computation. Certain embodiments utilize, for a given service chain, aggregate information about the SVMs in each host in a data center in order to perform the service path computation. The use of aggregate information, as will be discussed, provides several advantages and improvements to the computing device(s) used to perform the service path computation. For example, aggregate information for the SVMs on each host machine maintained and used for a given service chain can include one or more of the number of service paths created in each host for the service chain, the number of services provided by unused SVMs in each host for the service chain, and the number of consecutive services provided by unused SVMs in each host for the service chain. Other aggregate information could be maintained and used and for example can include the number of service paths created in each host for any service chain, though this may incur additional overhead for maintaining such information.

The use of aggregate information can reduce the amount of memory needed for storing information for service path computation as compared to storing more detailed information, thereby improving/reducing the memory usage of the computing device. Further, the use of aggregate information can reduce the computational complexity for computing service paths, thereby improving/reducing the processor usage of the computing device.

Further, the present disclosure provides specific methods of service path computation utilizing such aggregate information that can be used to compute efficient service paths. It should be noted that the methods may be heuristic approaches that may not provide the most efficient service paths, but still provide efficient service paths using less computational complexity. Further, it should be noted that though certain aspects are described with the aggregate information being maintained for each host during the computation of the service paths for a service chain, instead full information about the computed service paths could instead be maintained, and the aggregate information computed on the fly for each service path computation.

Figure 1:
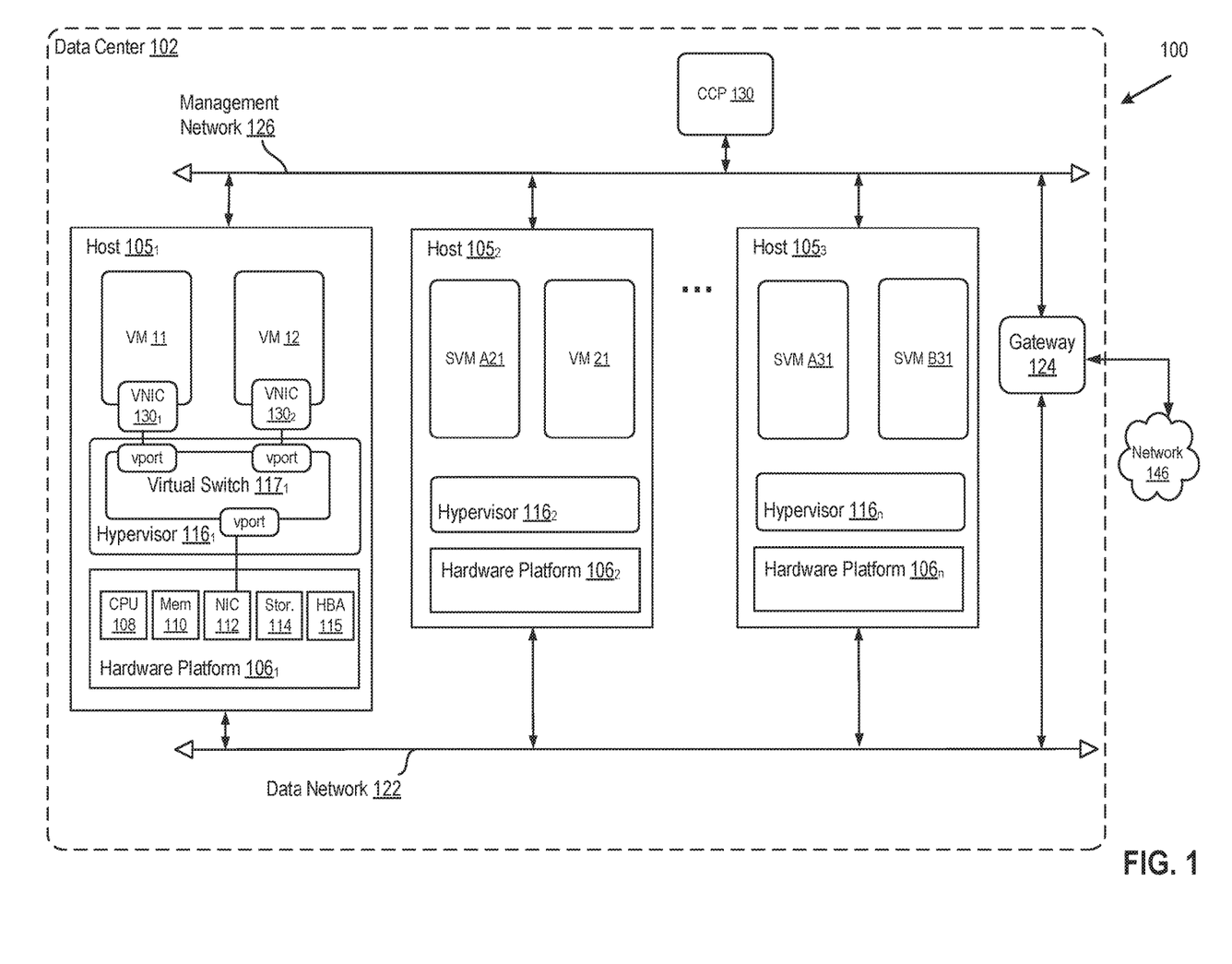
FIG. 1 depicts a block diagram of a computer system in which one or more embodiments of the present disclosure may be utilized.

FIG. 1 depicts a block diagram of a computer system 100 in which one or more embodiments of the present disclosure may be utilized. Data center 102 may be an on-premises data center or a cloud data center. Data center 102 includes host(s) 105, a virtualization manager 130, a gateway 124, a management network 126, and a data network 122. Although the management and data network are shown as separate physical networks, it is also possible in some implementations to logically isolate the management network from the data network using different VLAN identifiers. Each of hosts 105 may be constructed on a server grade hardware platform 106, such as an x86 architecture platform. For example, hosts 105 may be geographically co-located servers on the same rack or on different racks in any arbitrary location in datacenter 102.

Host 105 is configured to provide a virtualization layer, also referred to as a hypervisor 116, that abstracts processor, memory, storage, and networking resources of hardware platform 106 into multiple virtual machines, e.g., VMs 11 and 12 on host $105_1$, SVM A21 (providing service A) and VM 21 on host $105_2$, and SVM A31 (providing service A) and SVM B31 (providing service B) on host $105_3$. VMs on the same host 105 may run concurrently. The hypervisor architecture may vary. In some embodiments, a virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, the hypervisor may comprise system level software as well as a "Domain 0" or "Root Partition" virtual machine, which is a privileged machine that has access to the physical hardware resources of the host. In this implementation, a virtual switch, virtual tunnel endpoint (VTEP), etc., along with hardware drivers, may reside in the privileged virtual machine.

Hardware platform 106 of host 105 may include components of a computing device such as one or more processors (CPUs) 108, system memory 110, a network interface 112, storage system 114, a local host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as network 122 and external network 146. Network interface 112 may include one or more network adapters or ports, also referred to as Network Interface Cards (NICs), for connecting to one or more physical networks. In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical network, but different network segments, such as different subnets or different logical VLAN segments.

Storage system 114 represents local persistent storage devices (e.g., one or more hard disks, flash memory modules, solid state disks, and/or optical disks). Host bus adapter (HBA) 115 couples host 105 to one or more external storages (not shown), such as a storage area network (SAN) or distributed virtual SAN. Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory.

Gateway 124 provides VMs and other components in data center 102 with connectivity to network 146. Network 146 may be, for example, a direct link, a local area network (LAN), a wide area network (WAN) such as the Internet, another type of network, or a combination of these. Gateway 124 may manage external public IP addresses for VMs and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual computing instance, a physical device, or a software module running within host 105. Gateway 124 may include two gateways: a management gateway for management network 126 and a data gateway for data network 122.

CCP 130 communicates with hosts 105 via a network, shown as a management network 126, and carries out CCP functions as discussed herein. CCP 130 is further configured to compute service paths as discussed herein. As discussed, CCP 130 may be a computer program that resides and executes in a node such as in a central server in data center 102 or, alternatively, in a virtual computing instance (e.g., a VM) in one of hosts 105. Further, CCP 130 may be distributed and run on several nodes, as discussed.

Hypervisor 116 can include a virtual switch 117, which serves as a software-based interface between virtual machines running on hosts 105, network interface card(s) (NIC) 112, as well as other physical resources available on host 105. Though only host $105_1$ is shown including virtual switch $117_1$ for simplicity, it should be noted that each host 105 may include a virtual switch 117.

Each of the virtual machines running on host 105 may include a virtual network interface card (VNIC) 130, which is responsible for exchanging packets between the VM and hypervisor 116. Though only host $105_1$ is shown including VNICs $130_1$ and $130_2$ associated with VMs 11 and 12 for simplicity, it should be noted that each VM (including SVMs) on each host 105 may include a VNIC. VNICs 130 may be, in some cases, a software abstraction of a physical network interface card. Each of VNICs $130_1$ and $130_2$ is connected to a virtual port (vport) provided by virtual switch $117_1$, and virtual switch $117_1$ is connected to NIC 112 (via one or more vports) to allow network traffic to be exchanged between virtual machines executing on host 105 and other network destinations such as virtual machines hosted by other hosts on network 122, or devices reachable via an external network such as network 146.

One or more VMs in data center 102 may be associated with a particular service chain (e.g., for all traffic of the VM, for certain types of traffic of the VM, for traffic with a particular destination, etc.). The service chain may indicate one or more of a forward chain and a reverse chain associated with the VM. For example, the forward chain indicates a sequence of services to be performed for traffic that is outgoing from the VM. Further, the reverse chain indicates a sequence of services to be performed for traffic that is incoming to the VM.

In certain aspects, an administrator defines a service chain for the one or more VMs using the management plane, which is then sent to CCP 130. The administrator can define both the forward chain and a reverse chain of the service chain. The forward chain and reverse chain may include different services and/or have services in a different sequence than one another. In certain aspects, if the administrator only defines the forward chain (e.g., services A-> B->C), then by default the reverse chain is the reverse sequence (e.g., services C->B->A) of the forward chain.

In certain aspects, CCP 130 is configured to perform service path computation for service chains as further discussed herein to generate multiple service paths corresponding to a given service chain. The CCP 130 then assigns one of the multiple service paths to the VM associated with the service chain. In particular, CCP 130 communicates network configuration data to various network elements of hosts 105 to ensure traffic associated with the VM is sent along the assigned service path and the services are applied to the traffic.

For example, to configure VM 11 with the forward service path SVM A21->SVM B31, the CCP 130 would send network configuration information to each of hosts $105_1$-$105_2$ (e.g., and also host $105_3$). The network configuration information sent to each host could include a service table that indicates the MAC addresses of each SVM in each hop along the service path for VM 11. The service table may also indicate a virtual network interface (e.g., VNIC) of each SVM in each hop along the service path for VM 11. The service table may indicate (e.g., implicitly) that for any packet with a destination IP address of a destination outside of VM 11 and source IP address of VM 11, that the packet should be sent along the service path. Each host 105 includes a local control plane (not shown) that is part of the hypervisor 116 that configures a kernel of the hypervisor 116 to implement the service table as associated with the VNICs 130 of the VMs and SVMs associated with the service path. For example, the kernel of the hypervisor $116_1$, when receiving a packet at VNIC $130_1$ from VM 11 with a destination outside of VM 11 is configured to set a next-hop MAC address of the packet to SVM A21 based on the configuration by the LCP. Accordingly, the packet is forwarded to SVM A21. Similarly, after SVM A21 receives and services the packet, it is sent to SVM B31. SVM B31 then receives the packet, and it is sent to its destination. It should be noted that the kernel of the hypervisor implementing the service table and forwarding the packet is just an example, and other components may implement the service table and forward the packet as discussed, such as a component in the user space, a "Domain 0" or "Root Partition" virtual machine, etc.

Figure 2:
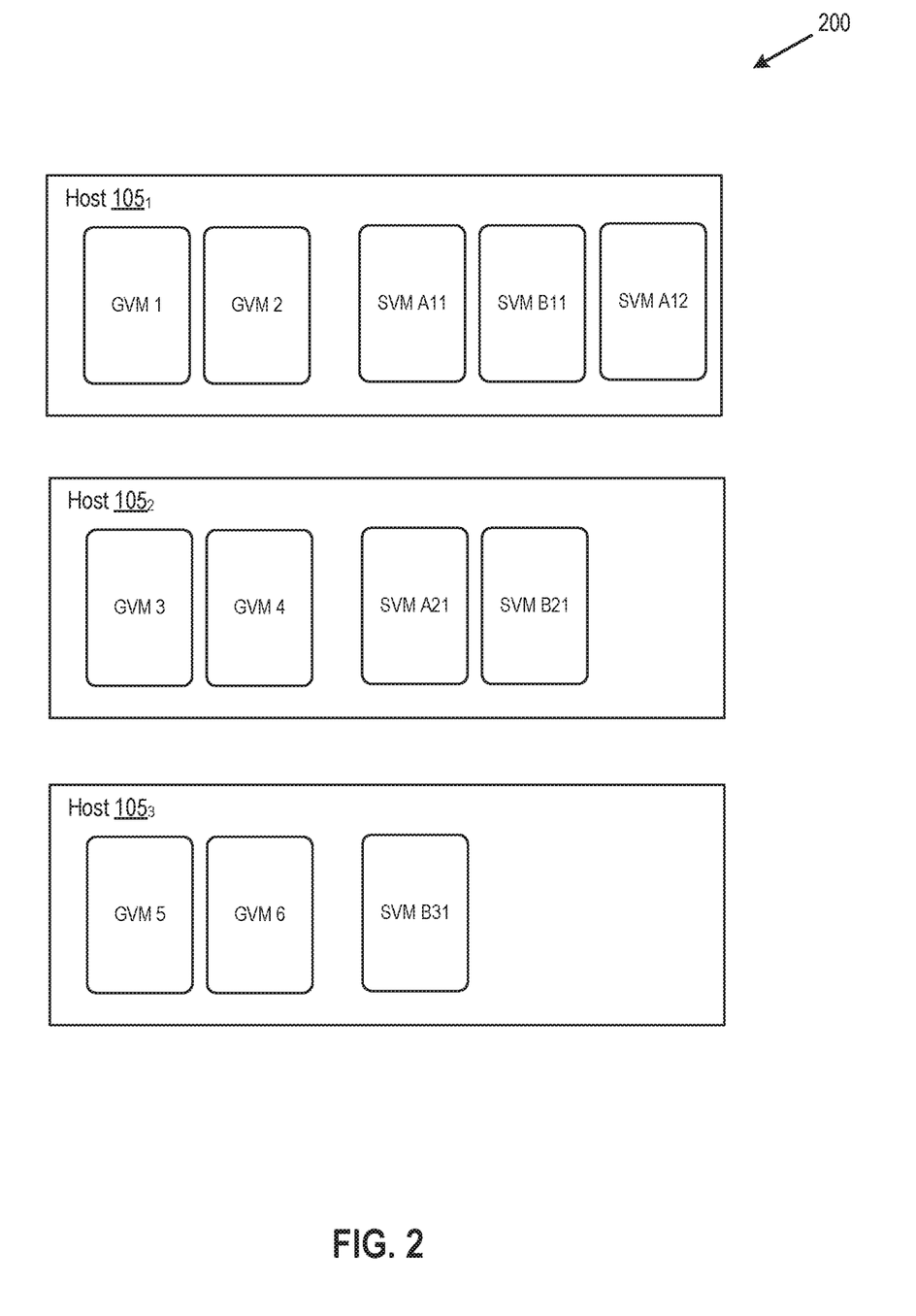
FIG. 2 depicts a block diagram of another computer system in which one or more embodiments of the present invention may be implemented.

FIG. 2 depicts a simplified block diagram of a computer system 200 in which one or more embodiments of the present disclosure may be utilized. In particular, FIG. 2 depicts a computer system 200 that utilizes a host-based service deployment. In a host-based service deployment, SVMs run in the same host as VMs with traffic to be rerouted (also referred to herein as guest VMs (GVMs)). In certain aspects, a local service path computation scheme, as discussed further herein, is used for service path computation for a host-based service deployment. Computer system 200 is just an example of a host-based service deployment, and a host-based service deployment can include more or fewer hosts, and more or fewer GVMs and SVMs.

As shown, computer system 200 includes three hosts $105_1$-$105_3$. The hosts 105 may include the same elements as those in FIG. 1, but they are not shown for sake of simplicity. Further, the hosts 105 are connected via a network, like shown in FIG. 1, but the connection is not shown for sake of simplicity. Host $105_1$ includes GVM 1, GVM 2, SVM A11, SVM B11, and SVM A12. Host $105_2$ includes GVM 3, GVM 4, SVM A21 and SVM B21. Host $105_3$ includes GVM 5, GVM 6, and SVM B31.

Figure 3:
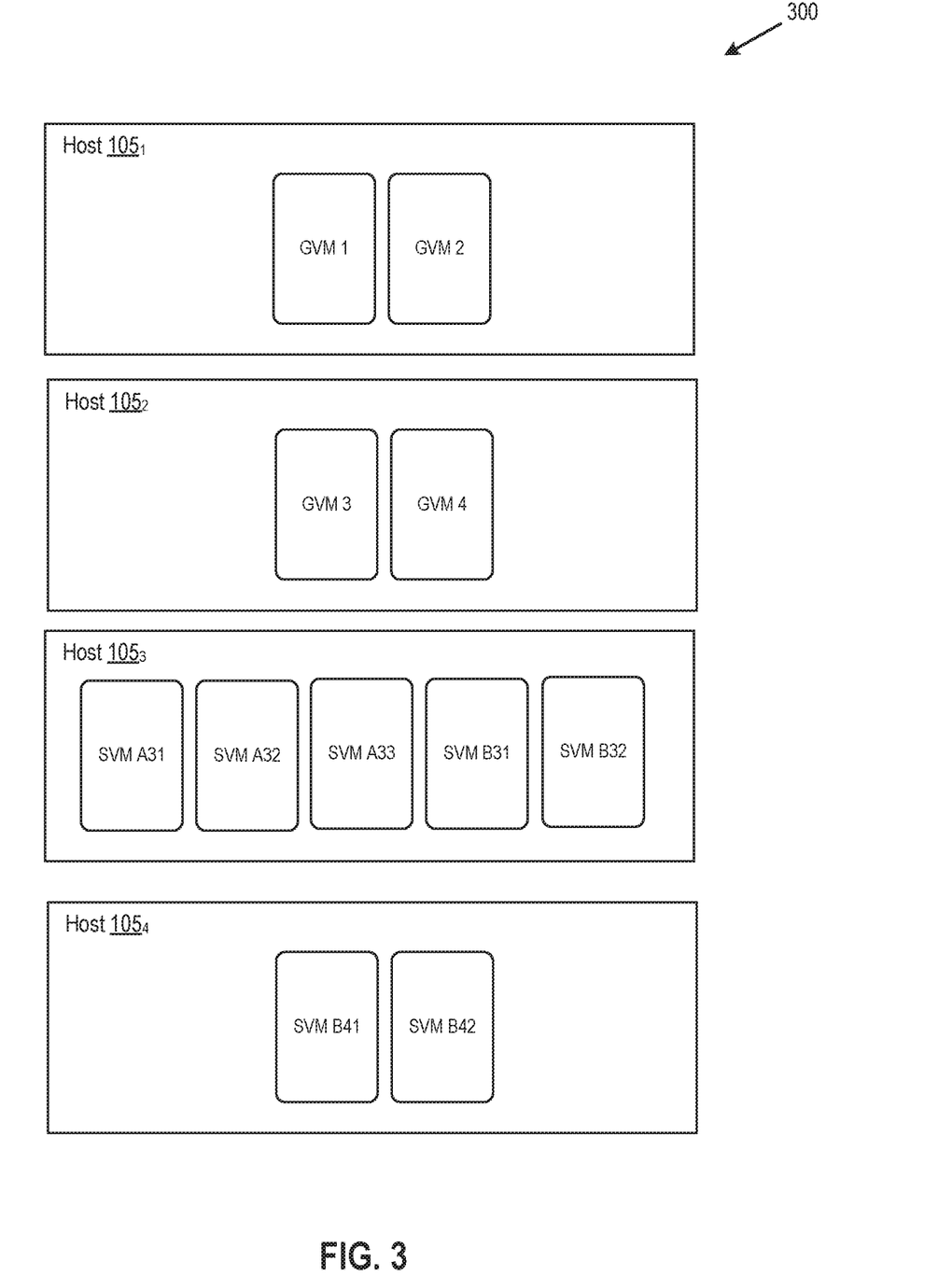
FIG. 3 depicts a block diagram of another computer system in which one or more embodiments of the present invention may be implemented.

FIG. 3 depicts a simplified block diagram of a computer system 300 in which one or more embodiments of the present disclosure may be utilized. In particular, FIG. 3 depicts a computer system 300 that utilizes a cluster-based service deployment. A cluster refers to a set of hosts. In a cluster-based service deployment, SVMs run in hosts in a service cluster, and GVMs run in hosts of clusters other than the service cluster, meaning SVMs and GVMs are not on the same host. In certain aspects, a cluster service path computation scheme, as discussed further herein, is used for service path computation for a cluster-based service deployment. Computer system 300 is just an example of a cluster-based service deployment, and a cluster-based service deployment can include more or fewer hosts, additional clusters, and more or fewer GVMs and SVMs.

As shown, computer system 300 includes four hosts $105_1$-$105_4$. Host $105_1$ includes GVM 1 and GVM 2. Host $105_2$ includes GVM 3 and GVM 4. Host $105_3$ includes SVM A31, SVM A32, SVM A33, SVM B31, and SVM B32. Host $105_4$ includes SVM B41 and SVM B42.

Figure 4:
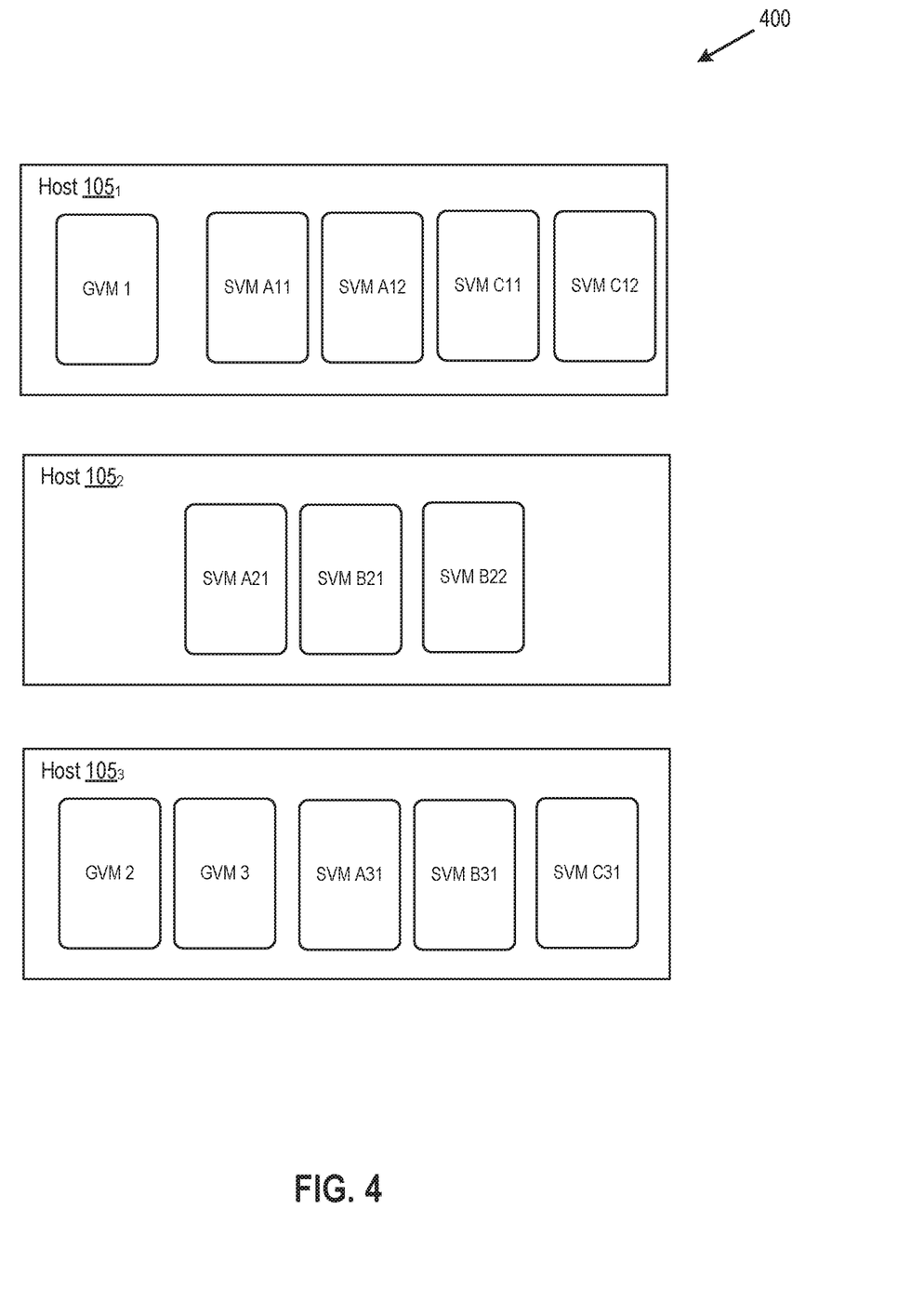
FIG. 4 depicts a block diagram of another computer system in which one or more embodiments of the present invention may be implemented.

FIG. 4 depicts a simplified block diagram of a mixed deployment computer system 400 in which one or more embodiments of the present disclosure may be utilized. Computer system 400 is a mix of the host-based service deployment and a cluster-based service deployment. In particular, host $105_1$ and host $105_3$ implement a host-based service deployment, while host $105_2$ implements a cluster-based service deployment. In certain aspects, either a local service path computation scheme or a cluster service path computation scheme can be used for service path computation for a mixed deployment. Computer system 400 is just an example of a mixed deployment, and a mixed deployment can include more or fewer hosts, additional clusters, and more or fewer GVMs and SVMs.

As shown, computer system 400 includes three hosts $105_1$-$105_3$. Host $105_1$ includes GVM 1, SVM A11, SVM A12, SVM C11, and SVM C12. Host $105_2$ includes SVM A21, SVM B21, and SVM B22. Host $105_3$ includes GVM 2, GVM 3, SVM A31, SVM B31, and SVM C31. SVMs A11, A12, A21, and A31 provide service A. SVMs B21, B22, and B31 provide service B. SVMs C11, C12, and C31 provide service C.

Figure 5:
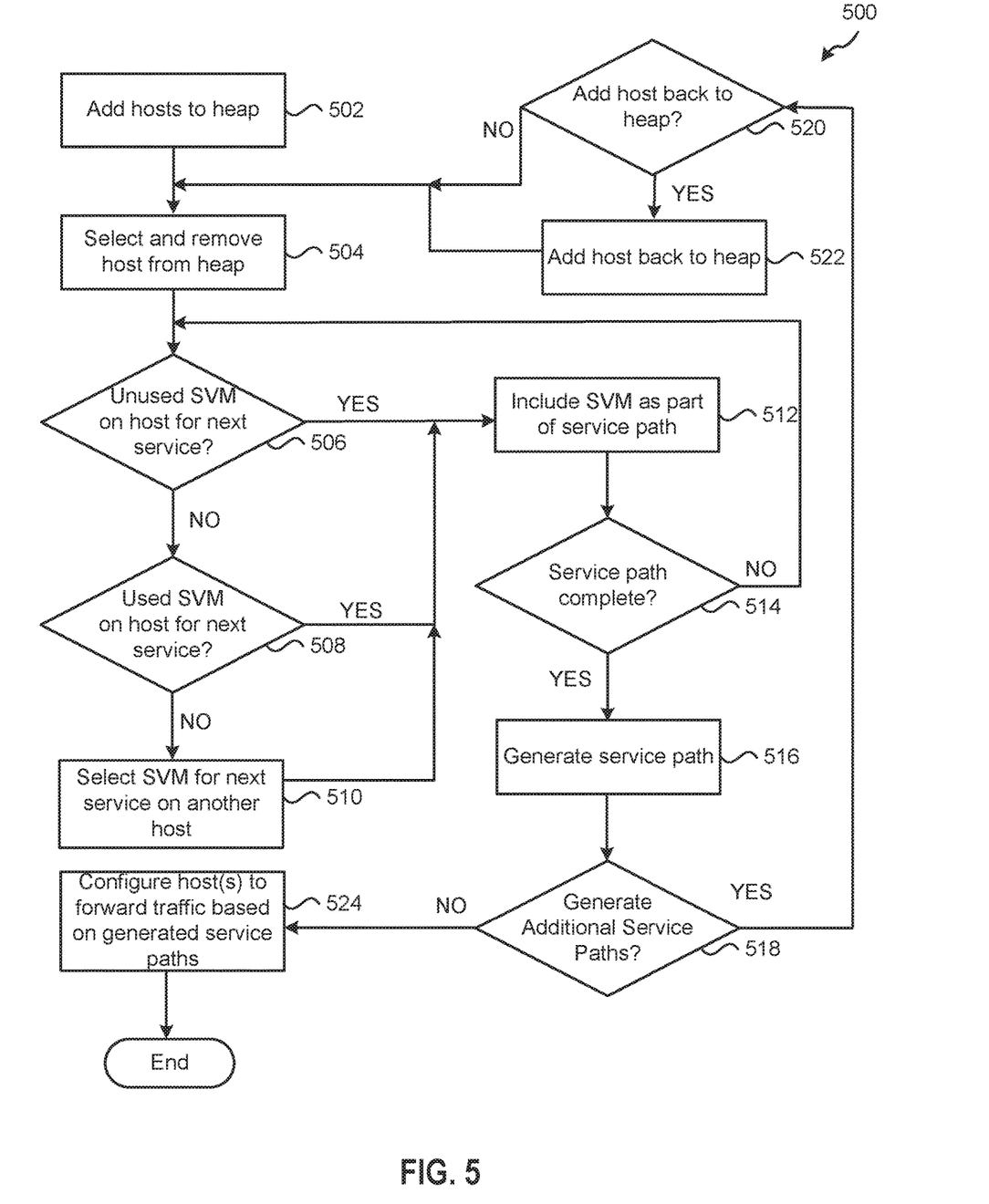
FIG. 5 depicts a flowchart of example operations for computing service paths according to one or more embodiments of the present invention.

FIG. 5 depicts a flowchart of example operations 500 for service path computation using a local service path computation scheme, according to one or more embodiments of the present invention. Operations 500 may be performed for service path computation for a particular service chain. In certain aspects, where the service chain includes a forward chain and a reverse chain that is the reverse of the forward chain, the operations 500 may be performed to generate a forward path (e.g., SVMA->SVMB), and the reverse path may be set as the reverse sequence of the forward path (e.g., SVMB->SVMA). In certain aspects, where the reverse chain is not just a reverse of the forward chain, operations 500 may separately be performed for the reverse chain to determine a reverse path. In certain aspects, if the same services are included in the forward chain and the reverse chain, the SVM used to perform the service in the forward path is used to perform the service in the reverse path as well.

In a local service path computation scheme, the service path selection policy is configured to reduce latency and increase throughput by preferring service paths for a GVM that include more SVMs on the same host as the GVM. Accordingly, traffic more often remains local to the host of the GVM, reducing the latency of sending the traffic between hosts. In certain aspects, the aggregate information used to perform the local service path computation scheme includes the number of service paths created in each host for the service chain and the number of services provided by unused SVMs in each host for the service chain.

Operations 500 are described with respect to computation of service paths for a service chain services A->B->C for computer system 400 as an example. Operations 500 may be performed by a CCP, such as CCP 130.

At block 502, hosts in the data center that include a SVM that provides a service that is in the service chain are added to a heap. In particular, aggregate information about the host, including the number of service paths created in each host for the service chain and the number of services provided by unused SVMs in each host for the service chain is added to the heap. The heap is stored in memory and/or storage at the CCP. The heap may be implemented as any appropriate data structure, such as a queue. In certain aspects, all hosts in the data center that include a SVM that provides a service that is in the service chain are added to a heap. In certain aspects, a subset of hosts in the data center that include a SVM that provides a service that is in the service chain are added to a heap.

Table 1 illustrates the heap after block 502. It should be noted that the order of hosts in the heap does not matter.

TABLE 1

| Host | Number of Paths Created | Number of services provided by unused SVMs |
| --- | --- | --- |
| Host $105_3$ | 0 | 3 |
| Host $105_2$ | 0 | 2 |
| Host $105_1$ | 0 | 2 |

As shown, none of the hosts 105 yet has a service path created for the service chain. Further, all SVMs are currently unused in a service path as there are no service paths computed. Host $105_3$ includes an unused SVM for each of services A, B and C, and therefore has a number of services provided by unused SVMs equal to 3. For host $105_2$, the number of services provided by unused SVMs is equal to 2 as it includes SVMs for services A and B. For host $105_3$, the number of services provided by unused SVMs is equal to 2 as it includes SVMs for services A and C.

At block 504, a host is selected from the heap and dequeued/removed from the heap based on the aggregate information associated with the host. If the heap is empty, the operations 500 may go to block 524. In particular, the host associated with the least number of paths created for the service chain among the hosts in the heap is selected. If there is a tie between multiple hosts, the host associated with the greatest number of services provided by unused SVMs for the service chain among the multiple hosts with a tie is selected. If there is still a tie, a host among the hosts with the least number of paths created and greatest number of services provided by unused SVMs for the service chain is selected at random, psuedo-randomly, in order of host ID, based on the one having the least number of paths created for any service chain, etc. In the example, host $105_3$ is selected as all the hosts have 0 number of paths created for the service chain, but $105_3$ has the greatest number of services provided by unused SVMs for the service chain. In other embodiments, the order of priority of the aggregate information for selecting the host may be reversed.

At block 506, it is determined if on the selected host there is an unused SVM (unused for a service path for the service chain) that provides the next service in the service chain, and if so, the unused SVM is selected. If yes, the operations 500 proceed to block 512. If no, the operations 500 proceed to block 508. In the first instance, this would be service A of the service chain. Here it is determined that host $105_3$ includes SVM A31, so SVM A31 is selected and operations would proceed to block 512. If there are multiple such unused SVMs on the host, one of such unused SVMs may be selected at random, psuedo-randomly, in order of SVM ID, based on the one that is part of the least number of paths created for this and/or any service chain, etc.

At block 508, it is determined if on the selected host there is a used SVM (used for a service path for the service chain) that provides the next service in the service chain, and if so, the used SVM is selected. If yes, the operations 500 proceed to block 512. If no, the operations 500 proceed to block 510. If there are multiple such used SVMs on the host, one of such used SVMs may be selected at random, psuedo-randomly, in order of SVM ID, based on the one that is part of the least number of paths created for this and/or any service chain, etc.

At block 510, a SVM on another host that provides the next service in the service chain is selected. If there are multiple such hosts that provide the next service, one of such hosts may be selected at random, psuedo-randomly, in order of host ID, based on the one that is part of the least number of paths created for this and/or any service chain, etc. If there is only one such SVM on the selected host, that SVM is selected. If there are multiple such SVMs on the selected host, one of such used SVMs may be selected at random, psuedo-randomly, in order of SVM ID, based on the one that is part of the least number of paths created for this and/or any service chain, etc. In some aspects, selection of an unused SVM is prioritized over selection of a used SVM on the selected host.

At block 512, the selected SVM is chosen as part of a service path for the service chain. Continuing at block 514, it is determined if the service path being generated includes an SVM for each of the services in the service chain. If yes, operations 500 continue to block 516. If no, operations 500 return to block 506 to select additional SVMs. Continuing with the example, SVM B31 is selected for service B and SVM C31 is selected for service C.

At block 516, the service path is generated for the service chain based on the selected SVMs. The service path is generated as {{forward path, number of host crossings}, {reverse path, number of host crossings}}. The number of host crossings is the number of times the path goes from one host to another for the service path. In this example, the forward path for the service path is generated as {SVM A31, SVM B31, SVM C31}. Further, in this case, the reverse path is set as the default reverse of the forward path, and therefore the reverse path is generated as {SVM C31, SVM B31, SVM A31}. The number of host crossings is 0 as all the SVMs are on the same host $105_3$. Accordingly, the service path is generated as:
{{SVM A31, SVM B31, SVM C31, 0}, {SVM C31, SVM B31, SVM A31, 0}}

Continuing at block 518, it is determined whether to continue to generate additional service paths for the service chain. If yes, operations 500 continue to block 520 or directly to block 522. If no, operations 500 go to block 524. In certain aspects, one or more criteria are used to determine whether to generate additional service paths for the service chain. In certain aspects, block 518 is not included, and block 516 proceeds directly to block 520.

One criteria can include whether a maximum number of service paths have been created for the service chain. If the maximum number have been created, it is determined not to generate additional service paths. If the maximum number has not been created, it is determined to generate additional service paths. The maximum number may be based on the maximum number of service paths that can be identified by an ID number (e.g., the maximum number that can be identified using 24-bits) or the maximum number may be based on the maximum number of possible service paths.

Another criteria can include whether a time limit has been reached. If the time limit has been reached, it is determined not to generate additional service paths. If the time limit has not been reached, it is determined to generate additional service paths.

Another criteria can include whether all SVMs that provide services of the service chain on the hosts added to the heap at block 502 have been used for a service path. If yes, it is determined not to generate additional service paths. If no, it is determined to generate additional service paths.

At block 520, it is determined whether to add the selected host back to the heap. In certain aspects, such as when block 518 is not included, it is determined if the selected host includes any unused SVMs that provide services of the service chain. If yes, operations 500 continue to block 522 where the host is added back to the heap, and then back to block 504. If no, operations 500 return to block 504 without adding the selected host back to the heap. In the example, there are no such unused VMs on host $105_3$ so it is not added back to the heap. In certain aspects, the selected host is always determined to be added back to the heap, such as when block 518 is included.

At block 524, one or more hosts 105 are configured to forward traffic based on one or more of the determined service paths. For example, a host running a GVM associated with the service chain is configured with a service table as discussed to forward packets from the GVM along one of the determined service paths. Further, hosts running SVMs that are part of the one of the determined service paths are each also configured with the service table as discussed to forward packets from the GVM along the one of the determined service paths.

Table 2 illustrates the heap after computation of the first service path {{SVM A31, SVM B31, SVM C31, 0}, {SVM C31, SVM B31, SVM A31, 0}}.

TABLE 2

| Host | Number of Paths Created | Number of services provided by unused SVMs |
| --- | --- | --- |
| Host $105_2$ | 0 | 2 |
| Host $105_1$ | 0 | 2 |

Based on operations 500, the second service path created would be {{SVM A11, SVM B22, SVM C11, 2}, {SVM C11, SVM B22, SVM A11, 2}}. For example, host $105_1$ is randomly selected. Further, SVM A11 is selected for being an unused SVM on host $105_1$ and randomly selected instead of SVM A12 also on host $105_1$. SVM B22 is randomly selected as an SVM that provides service B on a host other than host $105_1$. Further, SVM C11 is selected for being an unused SVM on host $105_1$ and randomly selected instead of SVM C12 also on host $105_1$. Host $105_1$ is added back to the heap as still including unused SVMs A12 and C12.

Table 3 illustrates the heap after computation of the second service path {{SVM A11, SVM B22, SVM C11, 2}, {SVM C11, SVM B22, SVM A11, 2}}.

TABLE 3

| Host | Number of Paths Created | Number of services provided by unused SVMs |
| --- | --- | --- |
| Host $105_2$ | 0 | 2 |
| Host $105_1$ | 1 | 2 |

Based on operations 500, the third service path created would be {{SVM A21, SVM B21, SVM C31, 1}, {SVM C31, SVM B21, SVM A21, 2}}. For example, host $105_2$ is selected as having the least number of paths created on the heap. Further, SVM A21 is selected for being on host $105_2$. SVM B21 is selected as an unused SVM that provides service B on host $105_2$. Further, SVM C31 is randomly selected as an SVM that provides service C on a host other than host $105_2$. Host $105_2$ is not added back to the heap as it includes no unused SVMs.

Table 4 illustrates the heap after computation of the third service path {{SVM A21, SVM B21, SVM C31, 1}, {SVM C31, SVM B21, SVM A21, 2}}.

TABLE 4

| Host | Number of Paths Created | Number of services provided by unused SVMs |
| --- | --- | --- |
| Host $105_1$ | 1 | 2 |

Based on operations 500, the fourth service path created would be {{SVM A12, SVM B21, SVM C12, 2}, {SVM C12, SVM B21, SVM A12, 2}}. For example, host $105_1$ is selected as the only host on the heap. Further, SVM A12 is selected for being the only unused SVM that provides service A on host $105_1$. SVM B21 is randomly selected as an SVM that provides service B on a host other than host $105_1$. SVM C12 is selected for being the only unused SVM that provides service C on host $105_1$. Host $105_1$ is not added back to the heap as it includes no unused SVMs. Based on the heap including no additional hosts, operations 500 go to block 524 with the four service paths having been computed.

It should be noted that the order in which the service paths are computed is not necessarily representative of a priority order. Instead, the CCP 130 assigns one of the service paths to a GVM based on other criteria, randomly, using round-robin, etc. For example, CCP 130 may assign a service path that starts with a SVM in the same host as a given GVM to the GVM. The CCP 130 may further take into consideration other criteria, such as load balancing, availability of hosts/SVMs, etc.

Figure 6:
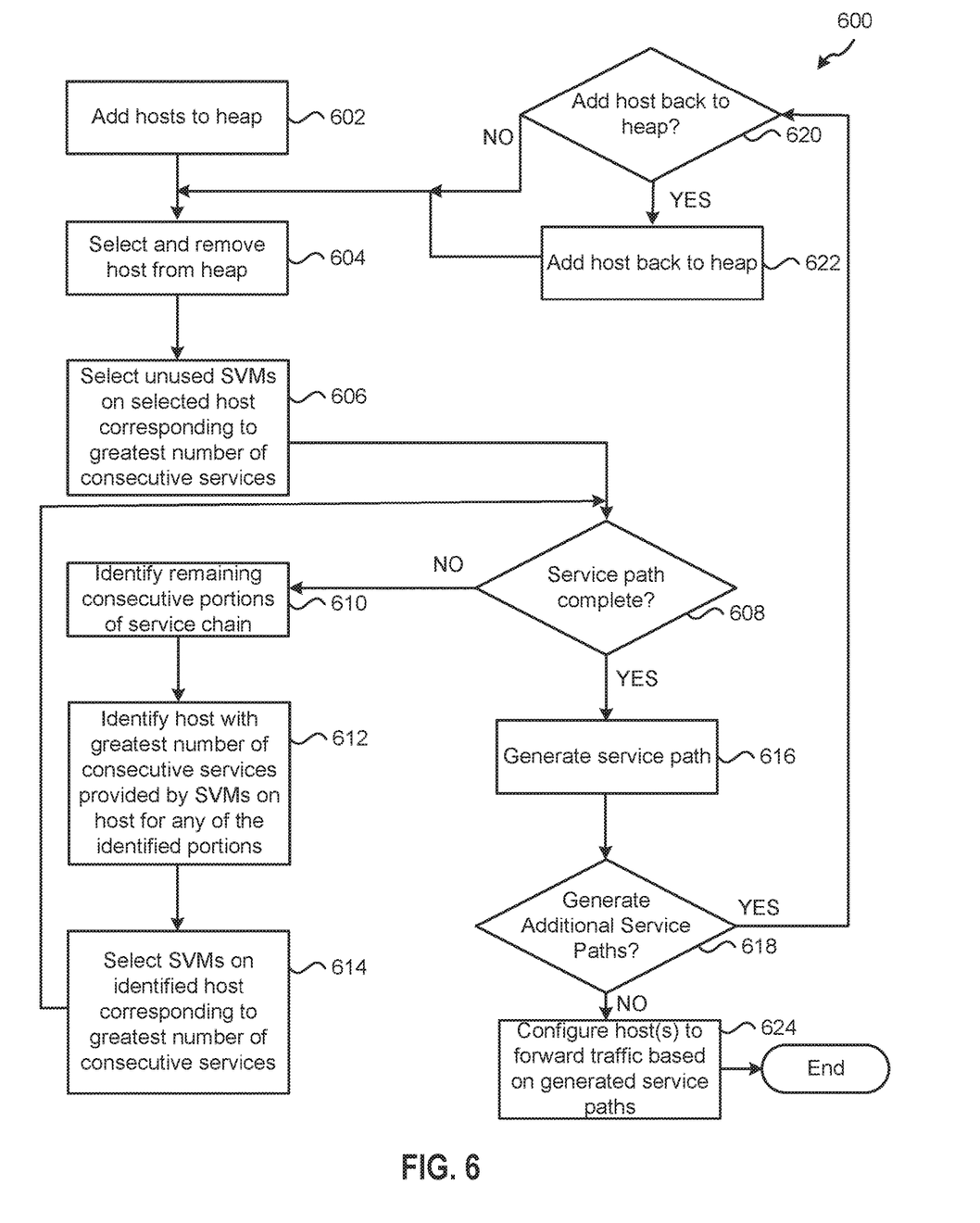
FIG. 6 depicts a flowchart of example operations for computing service paths according to one or more embodiments of the present invention.

FIG. 6 depicts a flowchart of example operations 600 for service path computation using a cluster service path computation scheme, according to one or more embodiments of the present invention. Operations 600 may be performed for service path computation for a particular service chain. In certain aspects, where the service chain includes a forward chain and a reverse chain that is the reverse of the forward chain, the operations 600 may be performed to generate a forward path (e.g., SVMA->SVMB), and the reverse path may be set as the reverse sequence of the forward path (e.g., SVMB->SVMA). In certain aspects, where the reverse chain is not just a reverse of the forward chain, operations 600 may separately be performed for the reverse chain to determine a reverse path. In certain aspects, if the same services are included in the forward chain and the reverse chain, the SVM used to perform the service in the forward path is used to perform the service in the reverse path as well.

In a cluster service path computation scheme, the service path selection policy is configured to reduce cross-host traffic inside the service cluster. In certain aspects, the aggregate information used to perform the cluster service path computation scheme includes the number of service paths created in each host for the service chain and the number of consecutive services provided by unused SVMs in each host for the service chain.

Operations 600 are described with respect to computation of service paths for a service chain for service A->B->C for computer system 400 as an example. Operations 600 may be performed by a CCP, such as CCP 130.

At block 602, hosts in the data center that include a SVM that provides a service that is in the service chain are added to the heap. In particular, aggregate information about the host, including the number of service paths created in each host for the service chain and the number of consecutive services provided by unused SVMs in each host for the service chain is added to the heap. In certain aspects, all hosts in the data center that include a SVM that provides a service that is in the service chain are added to a heap. In certain aspects, a subset of hosts in the data center that include a SVM that provides a service that is in the service chain are added to a heap.

Table 5 illustrates the heap after block 602. It should be noted that the order of hosts in the heap does not matter.

TABLE 5

| Host | Number of Paths Created | Number of consecutive services provided by unused SVMs |
| --- | --- | --- |
| Host $105_3$ | 0 | 3 |
| Host $105_2$ | 0 | 2 |
| Host $105_1$ | 0 | 1 |

As shown, none of the hosts 105 yet has a service path created for the service chain. Further, all SVMs are currently unused in a service path as there are no service paths computed. Host $105_3$ includes an unused SVM for each of services A, B and C, and therefore has unused SVMs that provide service for three consecutive services A, B, and C in the service chain. Host $105_2$ includes an unused SVM for each of services A and B, and therefore has unused SVMs that provide service for two consecutive services A and B in the service chain. Host 105₁ includes an unused SVM for each of services A and C, and therefore has unused SVMs that provide service for only 1 consecutive service A or 1 consecutive service C in the service chain.

At block 604, a host is selected from the heap and dequeued/removed from the heap based on the aggregate information associated with the host. If the heap is empty, the operations 600 may go to block 624. In particular, the host associated with the least number of paths created for the service chain among the hosts in the heap is selected. If there is a tie between multiple hosts, the host associated with the greatest number of consecutive services provided by unused SVMs for the service chain among the multiple hosts with a tie is selected. If there is still a tie, a host among the hosts with the least number of paths created and greatest number of consecutive services provided by unused SVMs for the service chain is selected at random, psuedo-randomly, in order of host ID, based on the one having the least number of paths created for any service chain, etc. In the example, host 105₃ is selected as all the hosts have 0 number of paths created for the service chain, but 105₃ has the greatest number of consecutive services provided by unused SVMs for the service chain. In other embodiments, the order of priority of the aggregate information for selecting the host may be reversed.

At block 606, for the selected host, the unused SVMs corresponding to the greatest number of consecutive services provided by unused SVMs for the service chain are selected for the service path. If there are multiple such unused SVMs for a particular service at the host, one of such unused SVMs may be selected at random, psuedo-randomly, in order of SVM ID, based on the one that is part of the least number of paths created for any service chain, etc. In the example, SVMs A31, B31, and C31 of host 105₃ are selected as corresponding to the greatest number of consecutive services provided by unused SVMs (i.e., 3). It should be noted that the SVMs selected for the service path may not always correspond to the first service of the service chain. In some other aspects, the greatest number of consecutive services provided by unused SVMs is calculated only starting from the first service in the service chain.

At block 608, it is determined if the service path being generated includes an SVM for each of the services in the service chain. If yes, operations 600 continue to block 616. If no, operations 600 continue to block 610 to select additional SVMs. In the example, a SVM is included for each of services A, B, and C, so operations continue to block 616.

At block 610, remaining consecutive portions of the service chain without corresponding selected SVMs are identified. In one example, there may be only one remaining consecutive portion. For example, for a service chain {A, B, C, D, E, F}, if SVMs are selected for A, B, and C, then there is one remaining consecutive portion D, E, F. If SVMs are instead selected for C, D, E, then there are two remaining consecutive portions: 1) A, B; and 2) F.

At block 612, a host with the greatest number of consecutive services provided by SVMs on the host corresponding to any of the identified remaining consecutive portions is identified. In particular, the CCP 130 maintains a list of hosts and the services provided by each host. Accordingly, the CCP 130 traverses the list to determine which host has the greatest number of consecutive services provided by SVMs (used or unused for a service path for the service chain) corresponding to any of the identified remaining consecutive portions. The CCP 130 may need to traverse the entire list. Alternatively, if the CCP 130 encounters a host in the list that includes SVMs corresponding to all the services of a remaining consecutive portion, that host may be identified.

Further, at block 614, for the identified host, the SVMs corresponding to the greatest number of consecutive services provided by SVMs on the host corresponding to any of the identified remaining consecutive portions are selected for the service path. If there are multiple such SVMs for a particular service at the host, one of such SVMs may be selected at random, psuedo-randomly, in order of SVM ID, based on the one that is part of the least number of paths created for any service chain, etc. Operations 600 then return to block 608.

At block 616, the service path is generated for the service chain based on the selected SVMs. Accordingly, the first service path is generated as:
{{SVM A31, SVM B31, SVM C31, 0}, {SVM C31, SVM B31, SVM A31, 0}}

Continuing at block 618, it is determined whether to continue to generate additional service paths for the service chain. If yes, operations 600 continue to block 620 or directly to block 622. If no, operations 600 go to block 624. In certain aspects, one or more criteria are used to determine whether to generate additional service paths for the service chain, such as those discussed with respect to FIG. 5. In certain aspects, block 618 is not included, and block 616 proceeds directly to block 620.

At block 620, it is determined whether to add the selected host back to the heap. In certain aspects, such as when block 618 is not included, it is determined if the selected host includes any unused SVMs that provide services of the service chain. If yes, operations 600 continue to block 622 where the host is added back to the heap, and then back to block 604. If no, operations 600 return to block 604 without adding the selected host back to the heap. In the example, there are no such unused VMs on host 105₃ so it is not added back to the heap. In certain aspects, the selected host is always determined to be added back to the heap, such as when block 618 is included.

At block 624, one or more hosts 105 are configured to forward traffic based on one or more of the determined service paths. For example, a host running a GVM associated with the service chain is configured with a service table as discussed to forward packets from the GVM along one of the determined service paths. Further, hosts running SVMs that are part of the one of the determined service paths are each also configured with the service table as discussed to forward packets from the GVM along the one of the determined service paths.

Table 6 illustrates the heap after computation of the first service path {{SVM A31, SVM B31, SVM C31, 0}, {SVM C31, SVM B31, SVM A31, 0}}.

TABLE 6

| Host | Number of Paths Created | Number of consecutive services provided by unused SVMs |
|---|---|---|
| Host 105₂ | 0 | 2 |
| Host 105₁ | 0 | 1 |

Based on operations 600, the second service path created would be {{SVM A21, SVM B21, SVM C11, 1}, {SVM C11, SVM B21, SVM A21, 1}}. For example, host 105₂ and host 105₁ both have zero paths created, however, host 105₂ has a greater number of consecutive services provided by unused SVMs, and therefore is selected. The greatest number of consecutive services provided by unused SVMs at host $105_2$ corresponds to services A and B. SVM A21 is selected at host $105_2$ based on it being the only unused SVM for service A. SVM B21 is randomly selected as an unused SVM that provides service B on host $105_2$. The remaining consecutive portion is C. The CCP traverses the list of hosts and finds host $105_1$ that provides service C, and randomly selects SVM C11 as a SVM that provides service C on host $105_1$. Host $105_2$ is added back to the heap as still including unused SVM B22.

Table 7 illustrates the heap after computation of the second service path {{SVM A21, SVM B21, SVM C11, 1}, {SVM C11, SVM B21, SVM A21, 1}}.

TABLE 7

| Host | Number of Paths Created | Number of consecutive services provided by unused SVMs |
|---|---|---|
| Host $105_1$ | 0 | 1 |
| Host $105_2$ | 1 | 1 |

Based on operations 600, the third service path created would be {{SVM A11, SVM B31, SVM C31, 1}, {SVM C31, SVM B31, SVM A11, 1}}. For example, host $105_1$ is selected as having the least number of paths created on the heap. Further, SVM A11 is randomly selected as an unused SVM that provides service A on host $105_1$. The remaining consecutive portion is B, C. The CCP traverses the list of hosts and finds host $105_3$ that provides services B and C, and selects SVMs B31 and C31 that provide services B and C, respectively. Host $105_1$ is added back to the heap as it includes unused SVM A12.

Table 8 illustrates the heap after computation of the third service path {{SVM A11, SVM B31, SVM C31, 1}, {SVM C31, SVM B31, SVM A11, 1}}.

TABLE 8

| Host | Number of Paths Created | Number of consecutive services provided by unused SVMs |
|---|---|---|
| Host $105_2$ | 1 | 1 |
| Host $105_1$ | 1 | 1 |

Based on operations 600, the fourth service path created would be {{SVM A21, SVM B22, SVM C12, 1}, {SVM C12, SVM B22, SVM A21, 1}}. For example, host $105_2$ is randomly selected. SVM A21 is selected at host $105_2$ based on it being the only SVM for service A. SVM B22 is selected at host $105_2$ based on it being the only unused SVM for service B. The CCP traverses the list of hosts and finds host $105_1$ that provides service C, and randomly selects SVM C12 as a SVM that provides service C on host $105_1$. Host $105_2$ is not added back to the heap as it includes no unused SVMs.

Table 9 illustrates the heap after computation of the fourth service path {{SVM A21, SVM B22, SVM C12, 1}, {SVM C12, SVM B22, SVM A21, 1}}.

TABLE 9

| Host | Number of Paths Created | Number of services provided by unused SVMs |
|---|---|---|
| Host $105_1$ | 1 | 1 |

Based on operations 600, the fifth service path created would be {{SVM A12, SVM B31, SVM C31, 1}, {SVM C31, SVM B31, SVM A12, 1}}. For example, host $105_1$ is selected as the only host on the heap. Further, SVM A12 is selected for being the only unused SVM that provides service A on host $105_1$. The remaining consecutive portion is B, C. The CCP traverses the list of hosts and finds host $105_3$ that provides services B and C, and selects SVMs B31 and C31 that provide services B and C, respectively. Host $105_1$ is not added back to the heap as it includes no unused SVMs. Based on the heap including no additional hosts, operations 600 go to block 624 with the five service paths having been computed.

It should be noted that the order in which the service paths are computed is not necessarily representative of a priority order. Instead, the CCP 130 assigns one of the service paths to a GVM based on other criteria, randomly, using round-robin, etc.

In certain aspects, for either cluster service path computation or local service path computation, the CCP 130 further computes additional service paths, such as for redundancy. For example, if all of the service paths computed utilize SVMs on the same host(s), and that host becomes unavailable, then there would be no service path for the CCP 130 to assign for traffic for that service chain. The CCP 130 could wait to compute additional service paths at that time that do not utilize the unavailable host(s), or could preemptively compute additional service paths that use different sets of hosts to provide redundancy.

Further, as discussed, the CCP can include multiple nodes and utilize sharding to select a node as the master node for performing service path computation for a particular service chain. In certain embodiments, different CCP nodes can handle computations for different service chains in parallel and different CCP nodes can be masters for different service chains. In certain aspects, the master CCP node may become unavailable while in the process of calculating service paths for a service chain, such as according to operations 500 or 600. A different CCP node may then be elected as the master CCP node. In order to prevent the new master CCP node from having to restart the calculation of service paths for the service chain from the beginning, all the CCP nodes may be configured to ensure that the data (e.g., heap and calculated paths) used for performing operations 500 or 600 is distributed and locally stored at each of the CCP nodes. For example, after each new service path is calculated and the heap updated at the current master CCP node, the master CCP node may distribute the data to the other CCP nodes. By utilizing aggregate data as discussed herein, the distribution of the data may be more feasible without using excessive network bandwidth, as opposed to having to use large amounts of bandwidth to distribute raw data.

It should also be noted that the operations 400 or 500 can be performed independent of the deployment of GVMs and SVMs in the data center. For example, it is not necessary to group particular SVMs together in a host in order to utilize operations 400 or 500. Further, as SVMs are added, removed, or migrated from one host to another, operations 400 or 500 can be performed to easily update the calculated service paths for a service chain. For example, if a SVM used by a service chain is added to a host, the host may then be added back to the heap as discussed, and additional service paths calculated for the service chain, without having to recalculate the previously calculated service paths for the service chain. If a SVM used by a service chain is removed from a host, the service paths that utilize that SVM may be deleted, the heap updated accordingly, and additional service paths calculated for the service chain, without having to recalculate the previously calculated service paths for the service chain still existing. Therefore, the techniques herein further reduce the computational complexity for updating service paths, further improving the processing usage at the CCP, and improving the performance of the CCP itself.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A computer system comprising one or more processors configured to perform a method for computing service paths for a service chain, the service chain identifying a sequence of services, the method comprising:
   including information about a plurality of hosts in a heap, wherein each of the plurality of hosts includes at least one service virtual computing instance (SVCI) configured to provide at least one of the services of the service chain, wherein the information includes, for each of the plurality of hosts, a number of service paths computed for the service chain at the host and one of a number of services provided by unused SVCIs of the host or a number of consecutive services provided by unused SVCIs of the host;
   selecting a host from the heap based on the information, the selecting comprising:
      when only one host of the heap has a least number of service paths computed for the service chain at the host, selecting the one host as the selected host; and
      when multiple hosts of the heap have the least number of service paths computed for the service chain at the host:
         when only one host of the heap has one of a greatest number of services provided by unused SVCIs of the host or a greatest number of consecutive services provided by unused SVCIs of the host, selecting the one host as the selected host; and
         when more than one host of the heap have one of the greatest number of services provided by unused SVCIs of the host or the greatest number of consecutive services provided by unused SVCIs of the host, selecting one of the more than one host;
   generating a first service path for the service chain, the first service path identifying at least one SVCI of the selected host; and
   configuring one or more of the plurality of hosts to forward traffic along the first service path.

2. The computer system of claim 1, wherein generating the first service path comprises:
   selecting SVCIs to include in the first service path in order of the sequence of services, wherein selecting a next SVCI for a next service according to the order comprises:
      when there is an unused SVCI that provides the next service on the selected host, selecting the unused SVCI as the next SVCI;
      when there is not an unused SVCI and there is a used SVCI that provides the next service on the selected host, selecting the used SVCI as the next SVCI; and
      when there is not an unused SVCI and there is not a used SVCI that provides the next service on the selected host, selecting the a SVCI an another host as the next SVCI.

3. The computer system of claim 1, wherein generating the first service path comprises:
   selecting to include in the first service path unused SVCIs of the selected host that provide services corresponding to the greatest number of consecutive services provided by unused SVCIs of the selected host;
   identifying any remaining consecutive portions of the service chain without corresponding selected SVCIs in the first service path;
   identifying a host of the plurality of hosts with a greatest number of consecutive services provided by SVCIs of the host corresponding to any of the identified remaining consecutive portions; and
   selecting to include in the first service path SVCIs on the identified host corresponding to the greatest number of consecutive services provided by SVCIs of the identified host corresponding to any of the identified remaining consecutive portions.

4. The computer system of claim 1, wherein the method further comprises generating additional service paths for the service chain until a termination criteria is met.

5. The computer system of claim 4, wherein the method further comprises:
   adding the selected host back to the heap when the selected host includes at least one unused SVCI corresponding to any service of the service chain; and
   not adding the selected host back to the heap when the selected host does not include at least one unused SVCI corresponding to any service of the service chain, wherein the termination criteria is the heap being empty.

6. The computer system of claim 1, wherein an unused SVCI comprises an SVCI not used as part of a service path for the service chain.

7. A method for computing service paths for a service chain, the service chain identifying a sequence of services, the method comprising:
   including information about a plurality of hosts in a heap, wherein each of the plurality of hosts includes at least one service virtual computing instance (SVCI) configured to provide at least one of the services of the service chain, wherein the information includes, for each of the plurality of hosts, a number of service paths computed for the service chain at the host and one of a number of services provided by unused SVCIs of the host or a number of consecutive services provided by unused SVCIs of the host;
   selecting a host from the heap based on the information, the selecting comprising:
      when only one host of the heap has a least number of service paths computed for the service chain at the host, selecting the one host as the selected host; and
      when multiple hosts of the heap have the least number of service paths computed for the service chain at the host:
         when only one host of the heap has one of a greatest number of services provided by unused SVCIs of the host or a greatest number of consecutive services provided by unused SVCIs of the host, selecting the one host as the selected host; and
         when more than one host of the heap have one of the greatest number of services provided by unused SVCIs of the host or the greatest number of consecutive services provided by unused SVCIs of the host, selecting one of the more than one host;
   generating a first service path for the service chain, the first service path identifying at least one SVCI of the selected host; and
   configuring one or more of the plurality of hosts to forward traffic along the first service path.

8. The method of claim 7, wherein generating the first service path comprises:
   selecting SVCIs to include in the first service path in order of the sequence of services, wherein selecting a next SVCI for a next service according to the order comprises:

when there is an unused SVCI that provides the next service on the selected host, selecting the unused SVCI as the next SVCI;

when there is not an unused SVCI and there is a used SVCI that provides the next service on the selected host, selecting the used SVCI as the next SVCI; and when there is not an unused SVCI and there is not a used SVCI that provides the next service on the selected host, selecting the a SVCI an another host as the next SVCI.

9. The method of claim 7, wherein generating the first service path comprises:

selecting to include in the first service path unused SVCIs of the selected host that provide services corresponding to the greatest number of consecutive services provided by unused SVCIs of the selected host;

identifying any remaining consecutive portions of the service chain without corresponding selected SVCIs in the first service path;

identifying a host of the plurality of hosts with a greatest number of consecutive services provided by SVCIs of the host corresponding to any of the identified remaining consecutive portions; and selecting to include in the first service path SVCIs on the identified host corresponding to the greatest number of consecutive services provided by SVCIs of the identified host corresponding to any of the identified remaining consecutive portions.

10. The method of claim 7, further comprising generating additional service paths for the service chain until a termination criteria is met.

11. The method of claim 10, further comprising:

adding the selected host back to the heap when the selected host includes at least one unused SVCI corresponding to any service of the service chain; and not adding the selected host back to the heap when the selected host does not include at least one unused SVCI corresponding to any service of the service chain, wherein the termination criteria is the heap being empty.

12. The method of claim 7, wherein an unused SVCI comprises an SVCI not used as part of a service path for the service chain.

13. A non-transitory computer readable medium having instructions stored thereon for performing a method for computing service paths for a service chain, the service chain identifying a sequence of services, the method comprising:

including information about a plurality of hosts in a heap, wherein each of the plurality of hosts includes at least one service virtual computing instance (SVCI) configured to provide at least one of the services of the service chain, wherein the information includes, for each of the plurality of hosts, a number of service paths computed for the service chain at the host and one of a number of services provided by unused SVCIs of the host or a number of consecutive services provided by unused SVCIs of the host;

selecting a host from the heap based on the information, the selecting comprising:

when only one host of the heap has a least number of service paths computed for the service chain at the host, selecting the one host as the selected host; and when multiple hosts of the heap have the least number of service paths computed for the service chain at the host:

when only one host of the heap has one of a greatest number of services provided by unused SVCIs of the host or a greatest number of consecutive services provided by unused SVCIs of the host, selecting the one host as the selected host; and when more than one host of the heap have one of the greatest number of services provided by unused SVCIs of the host or the greatest number of consecutive services provided by unused SVCIs of the host, selecting one of the more than one host;

generating a first service path for the service chain, the first service path identifying at least one SVCI of the selected host; and configuring one or more of the plurality of hosts to forward traffic along the first service path.

14. The non-transitory computer readable medium of claim 13, wherein generating the first service path comprises:

selecting SVCIs to include in the first service path in order of the sequence of services, wherein selecting a next SVCI for a next service according to the order comprises:

when there is an unused SVCI that provides the next service on the selected host, selecting the unused SVCI as the next SVCI;

when there is not an unused SVCI and there is a used SVCI that provides the next service on the selected host, selecting the used SVCI as the next SVCI; and when there is not an unused SVCI and there is not a used SVCI that provides the next service on the selected host, selecting the a SVCI an another host as the next SVCI.

15. The non-transitory computer readable medium of claim 13, wherein generating the first service path comprises:

selecting to include in the first service path unused SVCIs of the selected host that provide services corresponding to the greatest number of consecutive services provided by unused SVCIs of the selected host;

identifying any remaining consecutive portions of the service chain without corresponding selected SVCIs in the first service path;

identifying a host of the plurality of hosts with a greatest number of consecutive services provided by SVCIs of the host corresponding to any of the identified remaining consecutive portions; and selecting to include in the first service path SVCIs on the identified host corresponding to the greatest number of consecutive services provided by SVCIs of the identified host corresponding to any of the identified remaining consecutive portions.

16. The non-transitory computer readable medium of claim 13, wherein the method further comprises generating additional service paths for the service chain until a termination criteria is met.

17. The non-transitory computer readable medium of claim 16, wherein the method further comprises:

adding the selected host back to the heap when the selected host includes at least one unused SVCI corresponding to any service of the service chain; and not adding the selected host back to the heap when the selected host does not include at least one unused SVCI corresponding to any service of the service chain, wherein the termination criteria is the heap being empty.

* * * * *